2,881,077
EGG WHITES

Leo Kline and Andrew D. Singleton, Glenview, Ill., assignors to National Dairy Products Corporation, a corporation of Delaware No Drawing. Application October 14, 1955
Serial No. 540,648

5 Claims. (Cl. 99—113)

The present invention relates generally to an improved egg product and, more particularly, it relates to improvements in egg whites.

As is well known, eggs are broken and separated into yolks and whites, each of which have become items of commerce. The yolks are frequently utilized in the manufacture of salad dressings. The whites are now widely used in the preparation of cake mixes and are, of course, particularly adapted for use in so-called "angel mixes" which are marketed for the preparation of angel food cakes.

When egg whites are recovered from the separation process, they may be used directly or may be frozen for storage or shipping purposes, or they may be dried for addition to the cake mixes. It will be understood that in the case of frozen egg whites, they may be thawed and dried for incorporation into the cake mixes.

In any event, one of the principal requirements of egg albumen is that, after drying or freezing, it whips or aerates rapidly and to a high volume when it is reconstituted or thawed. Various agents have been added to egg white to assure improved whipping characteristics after freezing or drying. In this connection, the Harris et. al., patent, No. 2,039,409, discloses the addition to frozen egg white of many compositions which are generally higher fatty acid esters of a polyhydroxy substance in which the hydrogen of at least one hydroxy group is replaced by a hydrophilic radical. Similarly, Mink patents, No. 2,183,515 and No. 2,183,516, disclose the addition to dried egg whites of soaps, fatty alcohol or higher alcohol sulfonates and sulfates, sulfated fatty acid esters and amides, etc. In addition, a patent to Kothe, No. 2,638,654, teaches the addition of triethyl citrate to dried egg white to enhance the whipping properties.

In general, each of the known additives to egg white are foreign to and not naturally occurring in the human system and, while they provide in some cases improved whipping properties to the egg white, it has been considered desirable to provide an additive to egg white which would not only provide the improved whipping products to egg white but which would be, in addition, compatible with the human system. Such an additive would be non-detrimetal to the human system and even be favorable to it.

Accordingly, the main object of this invention is the provision of an improved egg product which includes a material not foreign to and naturally occurring in the human system. As will become more clear hereinafter, this and other objects of the invention are accomplished through the provision of an egg product which includes a soluble salt of a bile acid. This salt may be employed in low degree, while at the same time providing the results of the invention. Bile salts are known to be non-toxic in the amount used in accordance with this invention and exist in the human system so that there is no question as to their compatibility with the human system.

In accordance with this invention, egg white is separated and recovered. The bile salts may be immediately added to the egg whites, which, in turn, may then be frozen and dried. If the whites are frozen, I have found that they may be kept for extended periods and then dried, the bile salts still being effective to provide the results of the invention.

I have also found that the level of addition of the bile salt should be above about .025 percent of the egg solids. In general, I have found that as the amount of bile salt added is increased, the whipping properties increase. However, I find that an optimum level, which is a low level, is usually reached, beyond which level further addition of bile salts does not provide any substantial improvement in whipping properties.

The use of pure bile salts is, of course, preferred but it has been found that impure salts can be used if the level of salt is increased substantially in proportion to the degree of impurity. That is to say, the greater the degree of impurity, the higher the level of bile salt required to provide the desired result.

It has been found that the soluble salts of cholic acid, desoxycholic acid, hyodesoxycholic acid, glycocholic acid, lithocholic acid, and taurocholic acid, and modified bile acids, such as dehydrocholic acid, dehydrodesoxycholic acid, and dehydrohyodesoxycholic acid can be used and also intermediate oxidation or conversion products. While glycocholic acid salts and lithocholic acid salts are in accord with this invention, they are not readily available in any substantial degree of purity so that the present commercial use of such salts is limited. While impurities lessen the effect of the bile salts, the impurities are not deleterious. As will be seen hereinafter, if larger amounts of the impure salts are used, the advantages of the invention can be enjoyed.

As pointed out, this invention is only directed to the use of the soluble salts of the bile acids. In general, this limits the invention to the salts having monovalent cations, such as sodium, potassium and ammonium cations. The salts having bivalent cations, such as calcium and magnesium have not been found to satisfactorily provide the results of this invention as they have been found to be relatively insoluble.

The features of this invention may be enjoyed, as above indicated, by adding the soluble bile salts at any point to the egg white, as for example, before freezing, after thawing, just before drying, or after drying.

In the following examples, I indicate the desirable features of the invention. In each case, however, the egg white has been desugared by an enzymatic process which is widely used in the egg industry. Furthermore, in each case the level of the additive is indicated as the percent of egg solids, i.e. on an oven dry basis.

Example I

Sodium desoxycholate was added to spray dried egg white to a level of .1 percent. This product and dried egg white to which no salt was added were reconstituted in the same way with water and beaten. The results were:

| | Beat up value | Specific gravity of meringue after 75 seconds |
|---|---|---|
| Egg white | 3.8 | .208 |
| Egg white plus additive | 5.4 | .147 |

It will thus be seen that marked improvement is obtained by direct addition of bile salts to the dried egg white.

Example II

Sodium desoxycholate was added to egg white prior to drying to a level of .1 percent. This product and egg white to which no addition was made were spray dried and reconstituted in the same way. The results were:

|  | Beat up value | Specific gravity of meringue after 75 seconds |
|---|---|---|
| Egg white | 2.7 | .288 |
| Egg white plus additive | 5.7 | .141 |

Example III

The dried products from the above example were used in a commercial angel mix and the mix made into a cake. The results were:

|  | Beat up time, min. | Specific gravity of meringue | Cake height, mm. |
|---|---|---|---|
| Egg white | 3.5 | .162 | 112.5 |
| Egg white plus additive | 3.0 | .151 | 116 |

It is apparent that even though the egg white without additive was given extra beat up time, the white to which the bile salt was added gave a lighter meringue and a higher cake.

Example IV

In order to determine the effect of various levels of addition of sodium desoxycholate, this bile salt was added, before drying, at levels of .005 percent, .01 percent, .025 percent and .075 percent, and compared with egg white to which no bile salt was added. The results were:

|  | Beat up value | Specific gravity of meringue after 75 seconds |
|---|---|---|
| Egg white (E.W.) | 3.7 | .214 |
| E.W. plus .005% additive | 4.2 | .192 |
| E.W. plus .01% additive | 4.2 | .190 |
| E.W. plus .025% additive | 4.4 | .182 |
| E.W. plus .075% additive | 5.8 | .139 |

Example V

The high level bile salt product and the egg white to which no addition was made from the previous example were made into an angel food cake as in Example III. The results were:

|  | Beat up time, min. | Specific gravity of meringue | Cake height, mm. |
|---|---|---|---|
| Egg white | 7.25 | .179 | 119 |
| Egg white plus .075% additive | 4.25 | .161 | 125 |

It will be seen that despite the substantial extra beating, the egg white to which no addition was made did not produce as light a meringue or as high a cake.

Example VI

In order to illustrate the effect of using various bile salts, sodium desoxycholate, sodium hyodesoxycholate, sodium cholate and sodium taurocholate (70 percent pure) were used, each salt being used at various levels and being added after spray drying of the egg white.

Below I set forth the Slosberg values obtained at various levels of additive of the various bile salts:

|  | Percent of additive ||||||
|---|---|---|---|---|---|---|
|  | .05 | .10 | .15 | .2 | .3 | .5 |
| Egg white | (no additive—3.1) |||||||
| E.W. plus desoxycholate | 4.3 | 4.7 | 4.7 |  |  |  |
| E.W. plus hyodesoxycholate | 4.4 | 4.9 | 4.5 |  |  |  |
| E.W. plus cholate | 3.1 | 3.4 | 3.8 | 3.4 | 4.1 | 5.6 |
| E.W. plus taurocholate | 3.5 | 3.9 | 5.0 | 5.0 | 5.0 |  |

It will be noted that with the exception of sodium cholate, the optimum improvement is obtained at a level of about .15 percent. However, the sodium cholate performs better at higher levels.

Example VII

As has been previously noted, only soluble bile salts are in accord with this invention and such salts are the salts including monovalent cations. As will be seen below, the various salts of such cations provide substantially the same beat up values. In the table below, I show the results of a series of experiments in which various cations were employed to make salts of desoxycholic acid, the salts being utilized at the levels indicated.

| Level of additive in egg white | Desoxycholate salts of cations |||
|---|---|---|---|
|  | Sodium | Potassium | Ammonium |
| .10 percent | ¹4.9 | 4.6 | 5.0 |
| .15 percent | 4.3 | 4.9 | 4.9 |
| .20 percent | 5.2 | 5.2 | 4.9 |

¹ Beat up values.

The calcium and magnesium bile salts were found to be so insoluble as to be impractical to use in accord with this invention.

Example VIII

The bile salts provide improved properties to frozen egg whites, even though they are not dried. In the table below is shown the effect of addition of sodium desoxycholate to egg white before freezing, the egg white being subjected to the indicated degree of milling, i.e. mechanical working, before freezing. In each case, the egg was frozen and thawed, whereupon it was tested. The egg white was not desugared in this experiment.

| Treatment of egg white | Viscosity ¹ | Beat up time, mins. | Meringue specific gravity |
|---|---|---|---|
| Unmilled | 60 | 7.5 | .125 |
| Undermilled | 28 | 4.0 | .115 |
| Completely milled | 19.4 | 4.0 | .135 |
| Undermilled plus .05% | 28 | 2.0 | .110 |
| Completely milled plus .05% | 19.4 | 2.0 | .104 |

¹ This value was determined at 25° C. with a Zahn No. 2 cup.

It will be seen from the foregoing that addition of bile salts prior to freezing provides substantial improvement but it has also been found that the bile salts may be added after thawing with corresponding results.

It will be also seen that milling of the egg whites has an effect and it will be appreciated that the principles of this invention may be utilized in connection with milling of egg whites.

Mention has been made herein of Beat Up values. These values are a measure of beating rate and are expressed as milliliters per gram per minute of beating. In this test, it is, of course, understood that the higher the beat up value, the faster will be the beating rate. The beating in all cases was carried out at the highest speed in a Model K4B Hobart mixer. The general procedure for determining beating rate is described in an article by Slosberg et al, in Poultry Science, volume 27, pages 294–301 (1948).

Reference to beat up time and associated meringue gravity data refer to measurement obtained during the preparation of angel cakes using the more conventional household type mixer as, e.g. the Hamilton-Beach or Sunbeam. In this case it will be understood that the higher the beat up time the slower the beating rate.

For purposes of this specification, bile salts shall include the salts of modified bile acids, such as dehydrocholic acid, dehydrodesoxycholic acid and dehydrohyodesoxycholic acid and intermediates thereof. That is to say, modified bile acids include bile acids which have been oxidized by oxidation of one or more hydroxy groups on the bile acid.

As before indicated, other additives have been known heretofore. Certain improved results have been obtained over the use of other known additives. Thus, in a comparison between sodium desoxycholate and triethyl citrate at levels of .1 percent after drying of the egg white, in each case, a meringue specific gravity of .147 after 75 seconds of beating was obtained with the addition of triethyl citrate, while a meringue specific gravity of .141 was obtained with the addition of the bile salt. In another comparison at the same level of addition but with addition of the additives before drying, the results were:

| Additive (.1%) | Specific gravity |
|---|---|
| Triethyl citrate | .154 |
| Sodium desoxycholate | .147 |

In a comparison between sodium desoxycholate and an additive consisting of alkyl aryl sulfonate, the following results were obtained:

| Additive | Beat up time, min. | Specific gravity of meringue |
|---|---|---|
| Alkyl aryl sulfonate (.05 percent) | 2.0 | .121 |
| Sodium desoxycholate (.05 percent) | 2.0 | .110 |

While in the foregoing I have only described the addition of bile salts to egg whites, it will be understood that these salts are compatible with other additives, and, to provide various specific characteristics of the meringue and the cake products, it may be desirable to add other additives with the bile salts.

From the foregoing it will be seen that I have discovered a new egg product which includes a non-deleterious compound compatible with the human system. The product has various unique properties and is highly desirable in the manufacture of cake products, and particularly, angel cake mixes.

The various features of the invention which are believed new are set forth in the following claims.

I claim:

1. An egg albumen for angel cake mixes having angel cake making properties comprising, in combination, de-sugared egg albumen, an anion of a salt of a bile acid, a monovalent cation, the amount of bile salt being present at a level in excess of about .025 percent of the weight of the egg albumen and less than about .2 percent thereby being present in a sufficient amount to provide angel cake making properties to said albumen, said bile salt being a substantially water soluble salt.

2. An egg albumen for angel cake mixes having angel cake making properties comprising, in combination, de-sugared egg albumen, an anion of a salt of a bile acid selected from the group consisting of desoxycholic acid, hyodesoxycholic acid, cholic acid, taurocholic acid, dehydrocholic acid, dehydrodesoxycholic acid, and dehydrohyodesoxycholic acid, a monovalent cation selected from the group consisting of sodium, potassium, and ammonium, the amount of bile salt being present at a level in excess of about .025 percent of the weight of the egg albumen and being present in an amount of less than about .2 percent of the weight of the egg albumen thereby being present in a sufficient amount to provide angel cake making properties to said albumen, said bile salt being a substantially water soluble salt.

3. An egg albumen for angel cake mixes having angel cake making properties comprising, in combination, de-sugared egg albumen, a desoxycholate salt, a monovalent cation selected from the group consisting of sodium, potassium, and ammonium, the amount of bile salt being present at a level in excess of about .025 percent of the weight of the egg albumen and being present in an amount of less than about .2 percent of the weight of the egg albumen, thereby being present in a sufficient amount to provide angel cake making properties to said albumen, said bile salt being substantially water soluble.

4. An angel cake mix including egg albumen having angel cake making properties comprising, in combination, de-sugared agg albumen, an anion of a salt of a bile acid selected from the group consisting of desoxycholic acid, hyodesoxycholic acid, cholic acid, taurocholic acid, dehydrocholic acid, dehydrodesoxycholic acid, and dehydrohyodesoxycholic acid, a monovalent cation selected from the group consisting of sodium, potassium, and ammonium, the amount of bile salt being present at a level in excess of about .025 percent of the weight of the egg albumen and being present in an amount of less than about .2 percent of the weight of the egg albumen, thereby being present in a sufficient amount to provide angel cake making properties to said albumen, said bile salt being a substantially water-soluble salt.

5. An angel cake mix including an egg albumen having angel cake making properties comprising, in combination, de-sugared egg albumen, the desoxycholate salt of sodium, the amount of salt being present at a level in excess of about .025 percent of the weight of the egg albumen and being present in an amount of less than .2 percent of the weight of the egg albumen, thereby being present in a sufficient amount to provide angel cake making properties to said albumen, said salt being substantially water soluble.

References Cited in the file of this patent

UNITED STATES PATENTS

| 2,039,409 | Harris | May 5, 1936 |
| 2,183,516 | Mink | Dec. 12, 1939 |

OTHER REFERENCES

"Organic Chemistry," 1943, by G. A. Hill et al., published by the Blakiston Co., Philadelphia, pages 821 and 822, article entitled "Bile Acids."